United States Patent
Da Silveira et al.

(10) Patent No.: US 12,289,149 B2
(45) Date of Patent: Apr. 29, 2025

(54) HYBRID REMOTE ELECTRICAL TILT (HRET)

(71) Applicant: Telefonaktiebolaget LM Ericsson (publ), Stockholm (SE)

(72) Inventors: Martin Da Silveira, Ottawa (CA); Neil McGowan, Stittsville (CA); Francis Marion, Gatineau (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 268 days.

(21) Appl. No.: 17/795,305

(22) PCT Filed: Jan. 22, 2021

(86) PCT No.: PCT/IB2021/050510
§ 371 (c)(1),
(2) Date: Jul. 26, 2022

(87) PCT Pub. No.: WO2021/156695
PCT Pub. Date: Aug. 12, 2021

(65) Prior Publication Data
US 2023/0085342 A1 Mar. 16, 2023

Related U.S. Application Data

(60) Provisional application No. 62/970,542, filed on Feb. 5, 2020.

(51) Int. Cl.
*H04B 7/06* (2006.01)
*H01Q 1/24* (2006.01)

(52) U.S. Cl.
CPC ........... *H04B 7/0617* (2013.01); *H01Q 1/243* (2013.01)

(58) Field of Classification Search
CPC .............. H01Q 3/36; H01P 1/18; H01P 1/184
See application file for complete search history.

(56) References Cited

U.S. PATENT DOCUMENTS

2018/0108990 A1* 4/2018 Xiao ...................... H01Q 1/246
2018/0241122 A1* 8/2018 Jalali Mazlouman ... H01Q 3/34
(Continued)

FOREIGN PATENT DOCUMENTS

EP          3285330 A1     2/2018

OTHER PUBLICATIONS

Invitation to Pay Additional Fees and, Where Applicable, Protest Fee dated Mar. 17, 2021 issued in PCT Application No. PCT/IB2021/050510, consisting of 11 pages.
(Continued)

*Primary Examiner* — Ricardo I Magallanes
*Assistant Examiner* — Aladdin Abdulbaki
(74) *Attorney, Agent, or Firm* — Weisberg I.P. Law, P.A.

(57) ABSTRACT

A method and antenna system for achieving remote electrical tilt by a hybrid use of analog and digital phase shifting are disclosed. According to one aspect, a hybrid remote electrical tilt (HRET) antenna system includes a digital beamformer configured to apply a first set of at least one phase shift to each antenna subarray of at least one group of at least one antenna subarray. The at least one phase shift is determined to suppress sidelobes when a beam is steered to an elevation by the digital beamformer. The HRET antenna system also includes at least one analog phase shifter configured to apply a second set of at least one phase shift to at least one antenna subarray of each group of at least one antenna subarray so that a combined phase shift applied to each antenna element steers the beam to the elevation while suppressing the sidelobes.

24 Claims, 9 Drawing Sheets

(56) References Cited

U.S. PATENT DOCUMENTS

| | | | |
|---|---|---|---|
| 2019/0013582 A1* | 1/2019 | Li | H01Q 1/246 |
| 2019/0319684 A1* | 10/2019 | Athley | H01Q 21/0025 |
| 2019/0349783 A1* | 11/2019 | Barker | H04W 16/28 |
| 2022/0190486 A1* | 6/2022 | Li | H01Q 21/0075 |

OTHER PUBLICATIONS

International Search Report and Written Opinion dated May 28, 2021 issued in PCT Application No. PCT/IB2021/050510, consisting of 15 pages.

\* cited by examiner

HYBRID REMOTE ELECTRICAL TILT (HRET)

CROSS-REFERENCE TO RELATED APPLICATIONS

This application is a Submission Under 35 U.S.C. § 371 for U.S. National Stage Patent Application of International Application No.: PCT/IB2021/050510, filed Jan. 22, 2021 entitled "HYBRID REMOTE ELECTRICAL TILT (HRET)," which claims priority to U.S. Provisional Application No. 62/970,542, filed Feb. 5, 2020, entitled "HYBRID REMOTE ELECTRICAL TILT (HRET)," the entireties of both of which are incorporated herein by reference.

TECHNICAL FIELD

Wireless communication and in particular, to achieving remote electrical tilt by a hybrid use of analog and digital phase shifting.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Existing Third Generation (3G) base station antennas and some 4G and 5G advanced antenna systems (AAS) have antennas for which the radiation beams may be steered or tilted in the vertical direction by using a remote electrical tilt (RET) unit in the antenna. A remote electrical tilt is a combination of splitters and phase shifters that will apply a different linear phase progression to the vertical antenna array elements to steer the beam. The amount of phase shift can be controlled remotely by the cellular operator.

Consider an N-column AAS antenna array 10 with 8 dual polarized antenna elements 12 per column as shown in FIG. 1. An example of an existing RET solution to achieve vertical tilting of the beam of each column and each polarization is shown in FIG. 2. In the example of FIG. 2, two of the dual polarized antenna elements 12 are combined or split to form a subarray for a total of four subarrays 14. In general, there can be any number of subarrays 14 and any number of elements 12 per subarray. The input is split by a four-way splitter 16. Each of the four signals is then passed through a phase shifter 18 and/or a delay line and then connected to the input of the subarray splitters 20. The phase shifters 18 are adjusted by an electric motor 22 which can be remotely controlled by the cellular operator. The four-way splitter 16 and phase shifters 18 are typically close to the input from where the signals have to be distributed to the subarrays.

An example of digital vertical tilting with two input signals and two four element subarrays 24-A and 24-B is shown in FIG. 3. In this case, the phases between the two input signals will steer the beam vertically. If the beam is tilted downwards, a large sidelobe above the horizon will appear. When the tilt value is increased, the sidelobe level can become unacceptable. The tilt range for this configuration is relatively small (around 3 degrees for a sidelobe suppression of 16 dB). In FIG. 3, the digital beamformer 25 is configured to provide the inputs to the subarrays 24-a and 24-B. The digital beamformer 25 is a conventional digital beamformer which can be configured or programmed to compute weight to be applied to signals to each antenna subarray so as to steer a beam in a desired direction.

The RET in existing antennas, as shown in FIG. 2, can achieve very good elevation beam steering performance, but the RET hardware is complex, heavy and expensive. This is especially true for AAS antennas with many dual polarized antenna columns. Each antenna column will have a RET network for each of the two polarizations. The RET is also quasi static as it is motor controlled (in the order of minutes), so changes are slow and typical changes are once or twice per day at most.

Some AAS antennas have multiple antenna subarray rows and columns with a digitally controlled input to each of the rows and columns, which is shown in FIG. 3 for one column, two inputs and two four element subarrays. The beam can then be digitally tilted in the vertical direction by adjusting the excitation of the digital input signals. However, the tilt range is limited due to the presence of sidelobes in the vertical direction above the horizon. If the antenna is digitally tilted too much, the sidelobe above the horizon can increase above sidelobe suppression specification, resulting in unacceptable antenna performance.

SUMMARY

Some embodiments advantageously provide a method and system for achieving remote electrical tilt by a hybrid use of analog and digital phase shifting.

Hybrid remote electrical tilt (HRET) is a combination of digital and analog beamforming and is used for increasing the vertical electrical tilt range. In some embodiments, the input signal of each row is split into two or more paths, each path leading to a different subarray. Some of the paths are connected directly to the subarrays and the other paths are connected to the subarrays via a phase shifter delay line, in some embodiments. Massive multiple input multiple output (MIMO) is enabled in the vertical direction by using (1) fast digital control for which the sidelobe levels are optimized, combined with (2) slower analog phase shifters closer to the antenna elements of the subarrays.

According to one aspect, a hybrid remote electrical tilt, HRET, antenna system having a distributed phase shifting system is provided. The HRET antenna system includes a digital beamformer configured to apply a first set of at least one phase shift to each antenna subarray of at least one group of at least one antenna subarray. The at least one phase shift is determined to suppress sidelobes when a beam is steered to an elevation by the digital beamformer. The HRET antenna system also include at least one analog phase shifter configured to apply a second set of at least one phase shift to at least one antenna subarray of each group of at least one antenna subarray so that a combined phase shift applied to each antenna element steers the beam to the elevation while suppressing the sidelobes.

According to this aspect, in some embodiments, each one of the at least one analog phase shifters is in proximity to a respective antenna subarray. In some embodiments, the digital beamformer is more remote from an antenna subarray than the analog phase shifter and wherein the at least one analog phase shifter is in proximity to the antenna subarray. In some embodiments, each group of the at least one group has two antenna subarrays, a phase shift of the first set of phase shifts being applied to both antenna subarrays in the group and a phase shift of the second set of phase shifts being applied to only one of the two antenna subarrays in the group of antenna subarrays. In some embodiments, the HRET antenna system further includes a two way splitter, wherein the two antenna subarrays in a group of antenna subarrays are fed by the two way splitter. In some embodiments, the two way splitter is positioned in proximity to the analog phase shifter. In some embodiments, each antenna subarray is comprised of a pair of dual polarized antennas. In some embodiments, the at least one analog phase shifter includes a sliding printed circuit board configured to move with respect to a printed circuit board having an antenna subarray. In some embodiments, the sliding printed circuit board has a U-shaped trace and is configured to overlap a trace on a printed circuit board having a plurality of antenna subarrays. In some embodiments, the printed circuit board includes strip line traces, the strip line traces being connected to respective antennas using vias. In some embodiments, at least one of the at least one analog phase shifter is configured to move radially. In some embodiments, the at least one analog phase shifter is configured to be selectively disabled to achieve digital beam forming only.

According to another aspect, a method in an antenna system to achieve hybrid remote electrical tilt is provided. The method includes applying via a digital beamformer a first set of at least one phase shift to each antenna subarray of at least one group of at least one antenna subarray, the at least one phase shift being determined to suppress sidelobes when a beam is steered to an elevation by the digital beamformer. The method also includes applying via at least one analog phase shifter a second set of at least one phase shift to at least one antenna subarray of each group of at least one antenna subarray so that a combined phase shift applied to each antenna element steers the beam to the elevation while suppressing the sidelobes.

According to this aspect, in some embodiments, the method includes positioning each one of the at least one analog phase shifter in proximity to a respective antenna subarray. In some embodiments, the digital beamformer is more remote from an antenna subarray than the analog phase shifter and the at least one analog phase shifter is in proximity to the antenna subarray. In some embodiments, each group of the at least one group has two antenna subarrays, a phase shift of the first set of phase shifts being applied to both antenna subarrays in the group and a phase shift of the second set of phase shifts being applied to only one of the two antenna subarrays in the group of antenna subarrays. In some embodiments, the two antenna subarrays in the group of antenna subarrays are fed by a two way splitter. In some embodiments, the two way splitter is positioned in proximity to the analog phase shifter. In some embodiments, each antenna subarray has four dual polarized antennas. In some embodiments, the analog phase shifter includes a sliding printed circuit board configured to move with respect to a printed circuit board having an antenna subarray. In some embodiments, the sliding printed circuit board has a U-shaped trace and is configured to overlap a trace on a printed circuit board having a plurality of antenna subarrays. In some embodiments, the printed circuit board includes strip line traces, the strip line signal traces being connected to respective antennas using vias. In some embodiments, the method further includes radially moving the analog phase shifter to adjust phase shift. In some embodiments, the method further includes selectively disabling the analog phase shifter to achieve digital beam forming only.

Some embodiments may have one or more of the following advantages.

1) The vertical remote electrical tilt range capability of AAS antennas is increased;
2) The combination of digital and analog tilt reduces the complexity, weight and cost of the electrical tilt solution compared to the existing RET solutions;
3) Lower loss than existing solutions, increasing the antenna efficiency;
4) Fast remote tilt changes can be done on a scheduler slot basis for massive MIMO with the digital control while maintaining sidelobe suppression performance set by the analog tilt configuration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
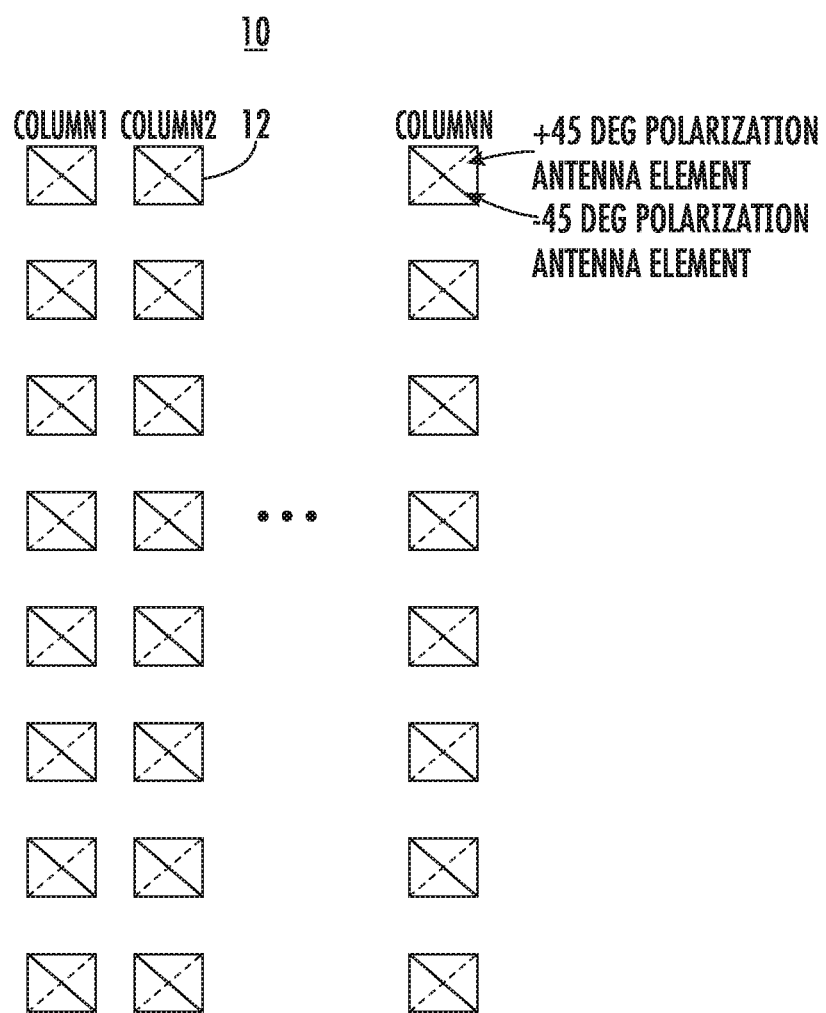
FIG. 1 is an 8×N dual polarized antenna array.
Figure 2:
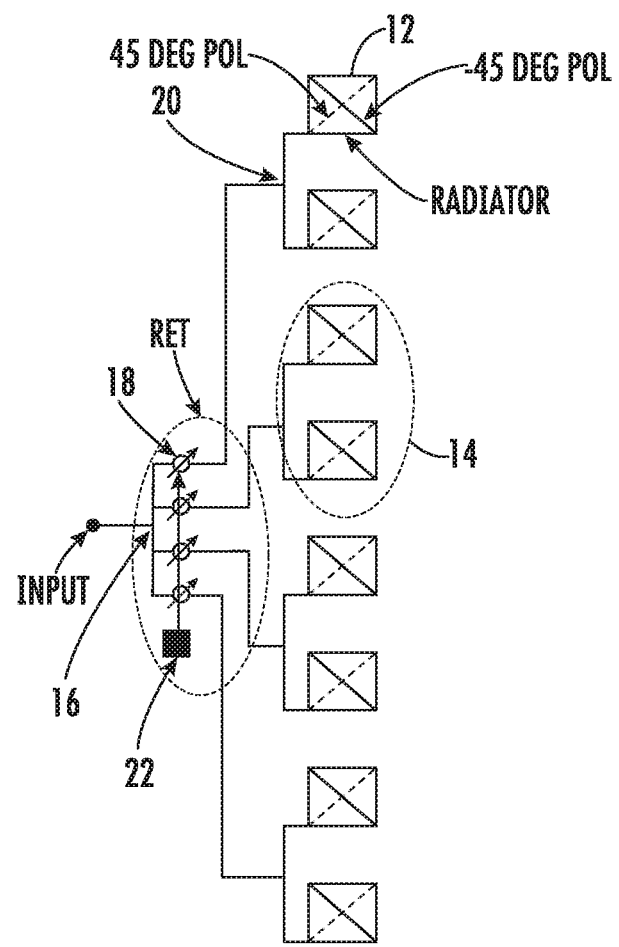
FIG. 2 is a conventional antenna array fed by analog phase shifters.

Before describing in detail exemplary embodiments, it is noted that the embodiments reside primarily in combinations of apparatus components and processing steps related to achieving remote electrical tilt by a hybrid use of analog and digital phase shifting. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

As used herein, the term "sidelobe suppression" or "suppressing the sidelobe" and the like, may be used to indicate that a combination of beam forming and analog phase shifting can cause a reduction of sidelobe power levels below what the sidelobes would be with digital beam forming alone, for a particular range of tilt angles.

Some embodiments are directed to achieving remote electrical tilt by a hybrid use of analog and digital phase shifting. In some embodiments, the digital phase shifting is remote from the antennas while the analog phase shifting is closer to the antennas.

Figure 3:
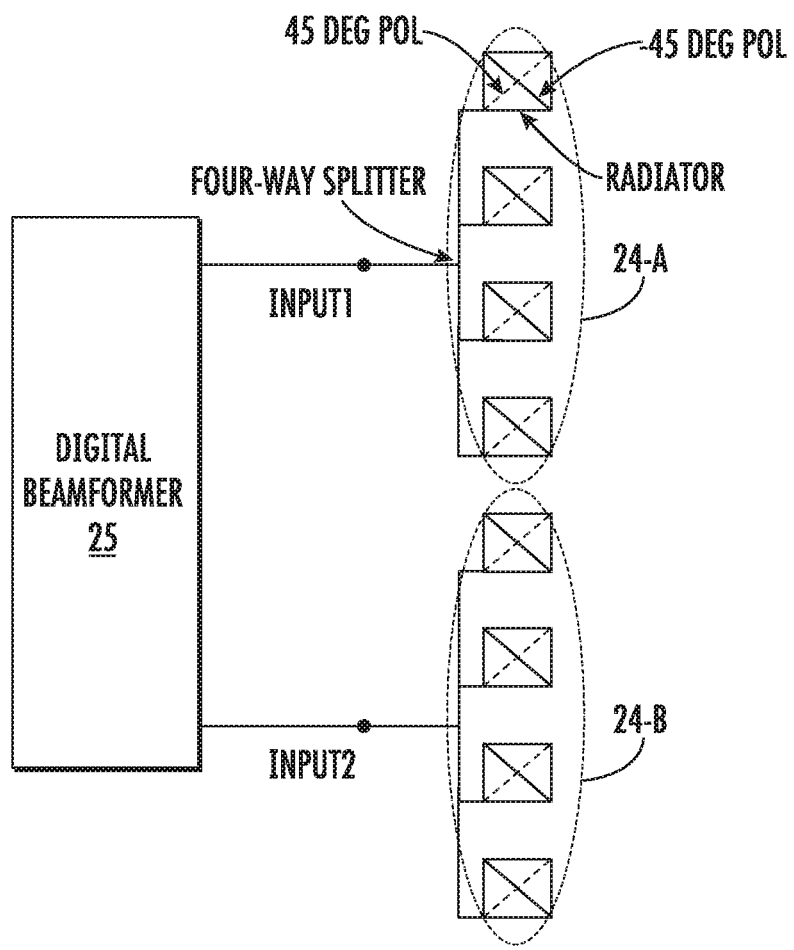
FIG. 3 is a conventional antenna array fed by a digital beamformer.
Figure 4:
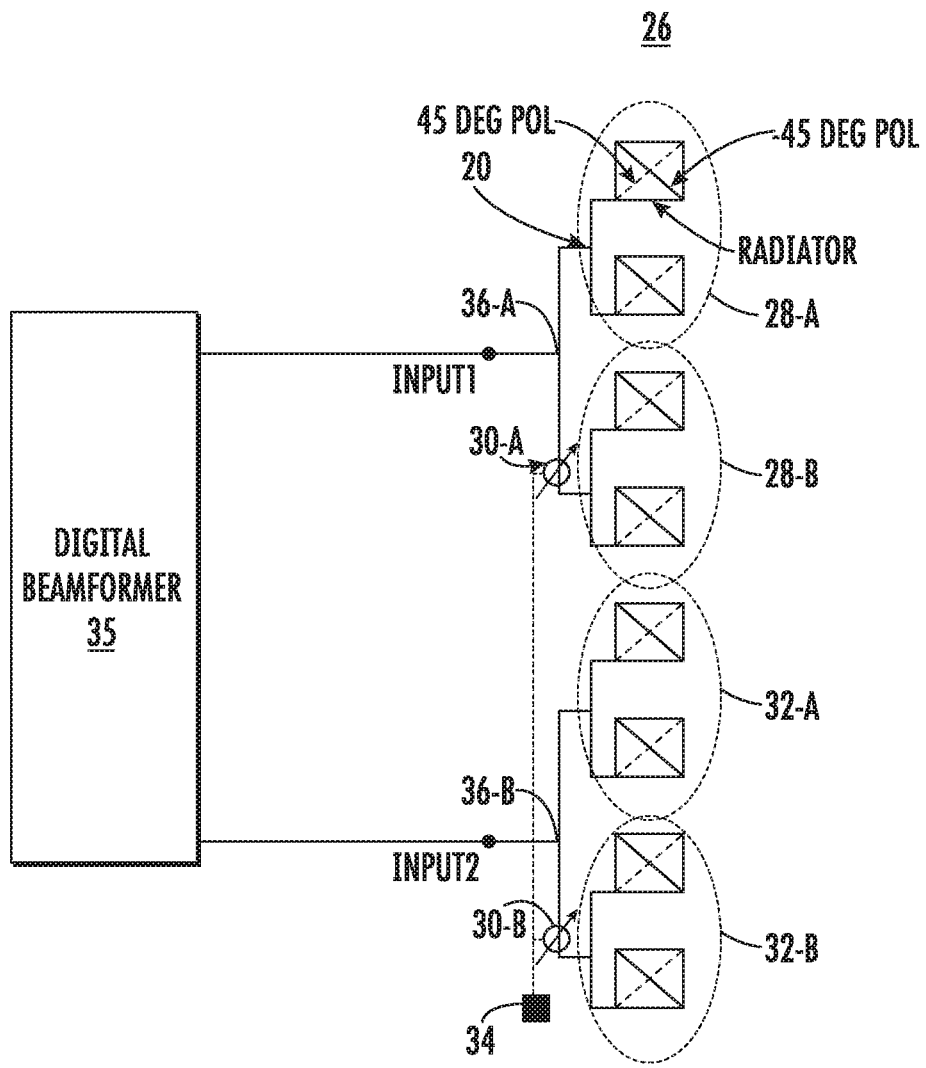
FIG. 4 is an antenna array fed by a combination of a beamformer and analog phase shifters according to principles disclosed herein.

Returning to the drawing figures, there is shown in FIG. 4 an example of an HRET configuration according to principles disclosed herein. In order to increase the tilt range of the RET system of FIG. 3, some embodiments use a hybrid digital beamforming and analog phase shifting configuration, as shown in FIG. 4. In the HRET antenna system 26 of FIG. 4, each input signal is split into two branches. The first branch signal of input 1 connects to the input of subarray 1 28-A (two elements per subarray in this example). The second branch signal of input 1 is connected to the input of a first phase shifter 30-A, and the output of the first phase shifter 30-A is connected to subarray 2 28-B. The same is done for the second input signal (input 2) to subarray 3 32A and to subarray 4 32B via the second phase shifter 30-B. The inputs 1 and 2 are from a digital beamformer 35 configured to achieve tilt with suppressed sidelobes. The digital beamformer 35 may be implemented in a central processing unit (CPU), other programmable microprocessor or field programmable gate array (FPGA), for example. The digital beamformer 35 may be formed as a hardware device or programmed to achieve electrical tilt by multiplying input signals by beam weights to steer a beam of the antenna array to the tilt angle and to perform the other functions described herein. In some embodiments, a digital beamformer, such as the digital beamformer 35, may be included in the equipment of a network node that has an antenna array forming a beam that can be steered. The phase shifters are controlled by a RET motor 34. The phase shifters 30-A, 30-B (collectively referred to herein as analog phase shifters 30) can be located close to the subarray splitters 36-A and 36-B (collectively referred to herein as splitters 36). With the combination of the digital inputs as well as analog phase shifters 30, equivalent performance of the HRET and existing configurations of four digital signals and four subarrays can be achieved. By setting the analog phase shift of the analog phase shifters 30-A and 30-B to an appropriate value, the analog RET can be disabled and digital beamforming only can be achieved.

Figure 5:
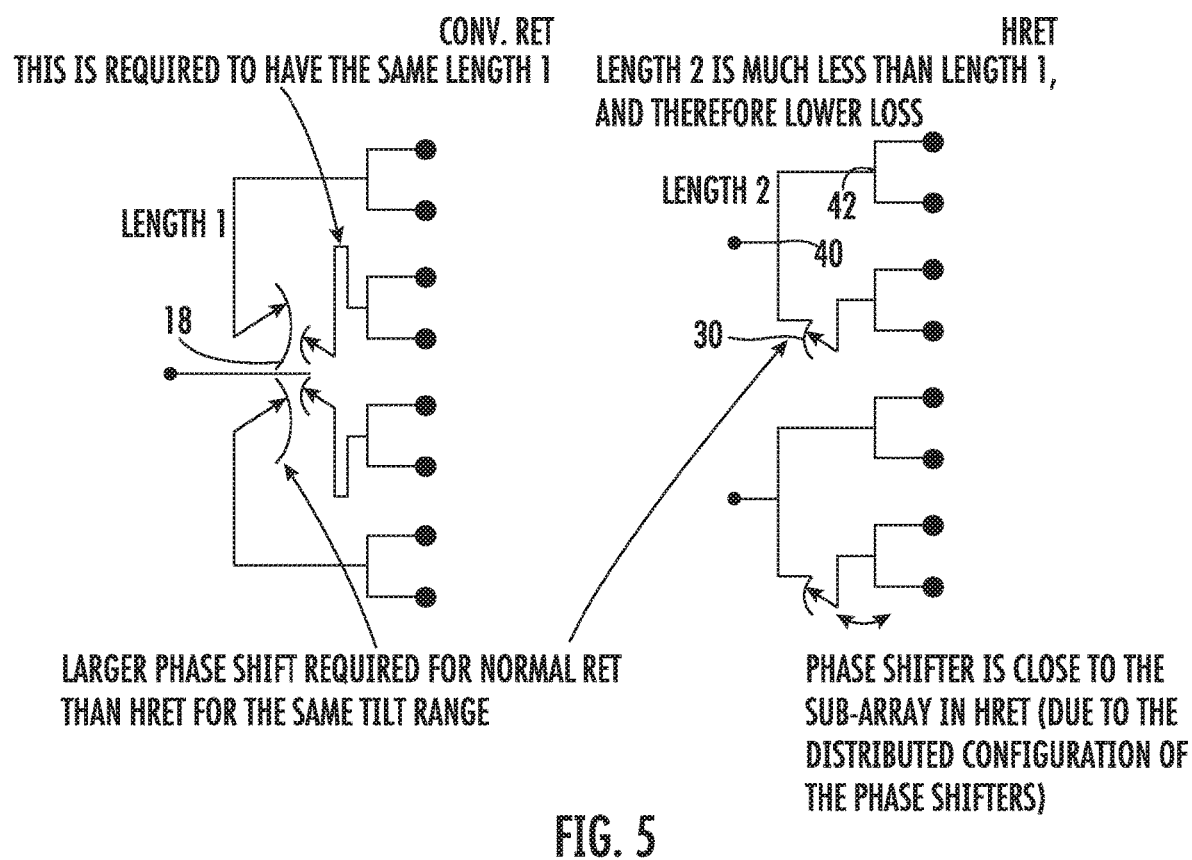
FIG. 5 is a side-by-side comparison of a conventional RET configuration and an HRET configuration constructed according to principles disclosed herein.
Figure 6:
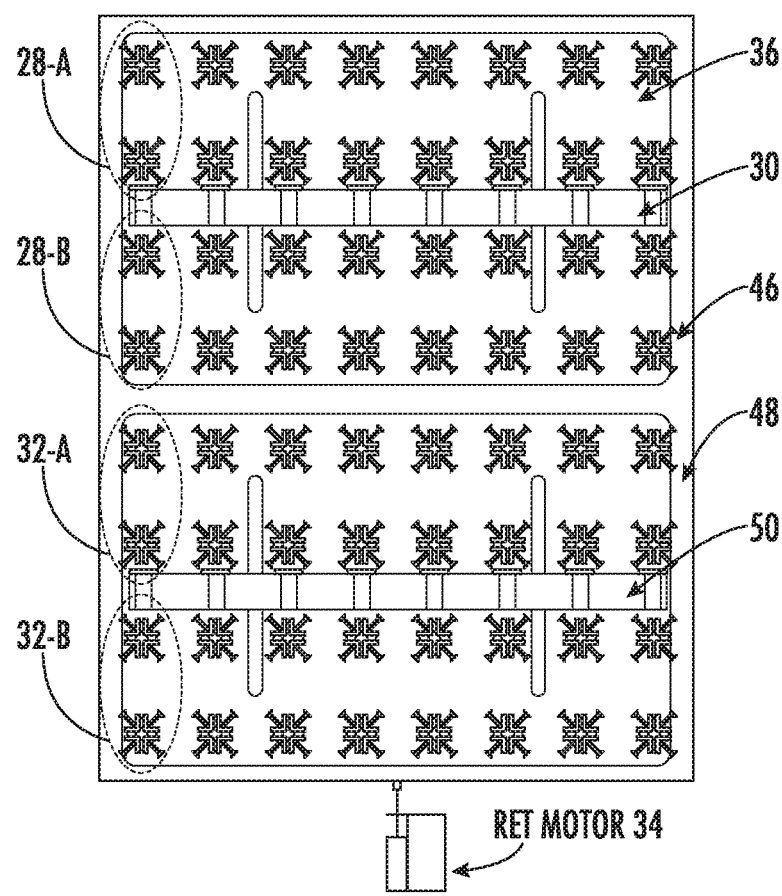
FIG. 6 is a plan view of a printed circuit board (PCB) constructed according to principles set forth herein.

FIG. 5 shows an example of a side-by-side comparison between analog phase shifters of a conventional RET configuration (on the left) and analog phase shifters of a HRET configuration (on the right) constructed according to principles set forth herein. The conventional RET configuration on the left has conventional analog phase shifters 18. The HRET configuration on the right has analog phase shifters 30. A smaller analog phase shift is required for the HRET on the right as compared to the conventional RET on the left for the same tilt range. This means the analog phase shifters 30 of the HRET configuration can be smaller and simpler than the analog phase shifters 18 of the conventional RET configuration. The smaller phase shift also means that the analog phase shifters 30 can be situated closer to the subarray. This, in turn, means that the stripline connecting the splitter 40 to the splitter 42 can be much shorter in the HRET configuration than in the conventional RET configuration. A shorter stripline saves printed circuit board space and reduces loss. Also, the stripline layout of the HRET configuration is simpler to implement than the stripline layout of the conventional RET configuration, FIG. 6 is a plan view of an example printed circuit HRET antenna system 44 having 8 columns of 4 rows of subarrays, each subarray 28-A, 28-B, 32-A and 32-B in a column having two antenna elements with two input signals. The antenna radiators 46 (which in this example are dual polarized), the antenna printed circuit board (PCB) 48, the slider PCBs 50, the subarray splitters 36 and analog phase shifters 30 may be on the same or different layers of a plurality of layers of the printed circuit HRET antenna system 44.

Figure 7:
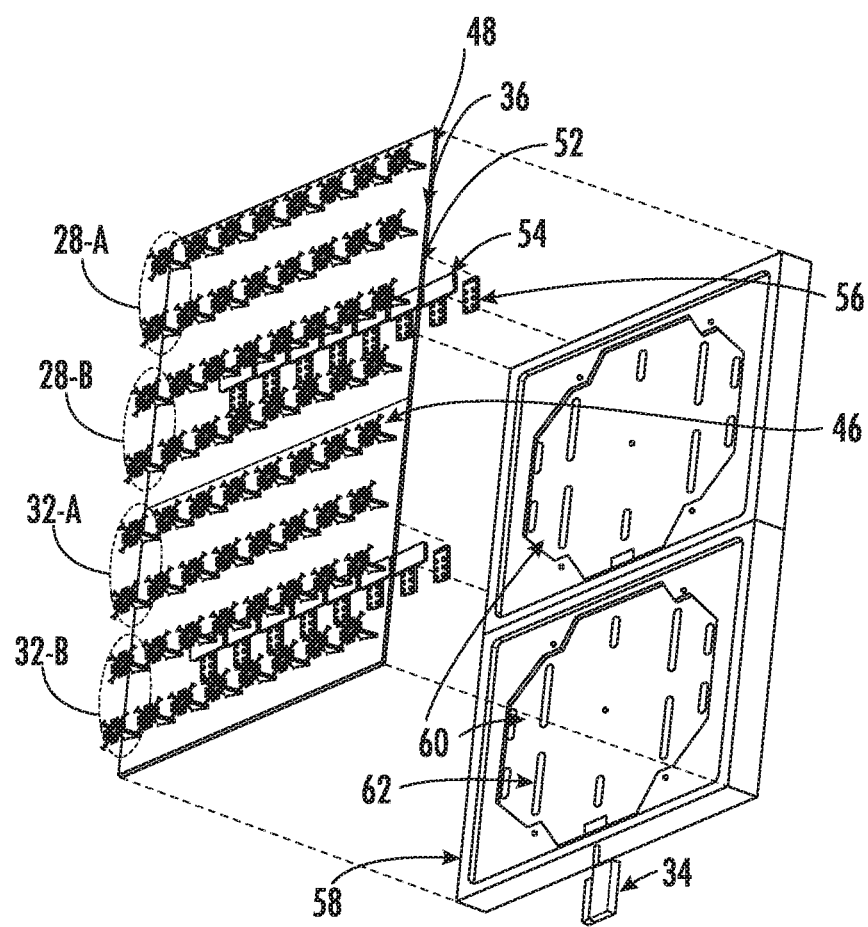
FIG. 7 is a perspective view of a partially unassembled printed circuit board according to principles set forth herein.

FIG. 7 is a perspective view of the partially assembled printed circuit HRET antenna system 44 with an antenna PCB phase shifter fixed part 52, a slider PCB phase shifter moving part 54 and slider PCB mounting structures 56. In the example of FIG. 7, the slider PCB phase shifter moving part 54 includes the slider PCB 50 shown in FIG. 6. The printed circuit HRET antenna system 44 may be mounted above a mounting chassis 58 that holds plastic slider plates 60 through openings 62. The plastic slider plates 60 may be mechanically connected to the slider PCB phase shifter moving part 54 by at least one pin, not shown, so that the plastic slider plates 60 and the slider PCB phase shifter moving part 54 move together in translation, driven by the RET motor 34. The input signals originate from the beamformer, not shown in FIG. 7. The slider PCB phase shifter moving part 54 moves relative to the antenna PCB phase shifter fixed part 52 to change the phase of the analog phase shifter 30. The analog phase shifter 30 may include the slider PCB phase shifter moving part 54, the antenna PCB phase shifter fixed part 52 and the slider PCB mounting structures 56. In some embodiments, the slider PCB phase shifter moving part 54 is assembled on the PCB 48 with the slider PCB mounting structures 56. Then, the printed circuit HRET antenna system 44 may be mounted on the mounting chassis 58, and the slider PCB phase shifter moving part 54 may be mechanically connected via a pin to the plastic slider plates 60.

Figure 8:
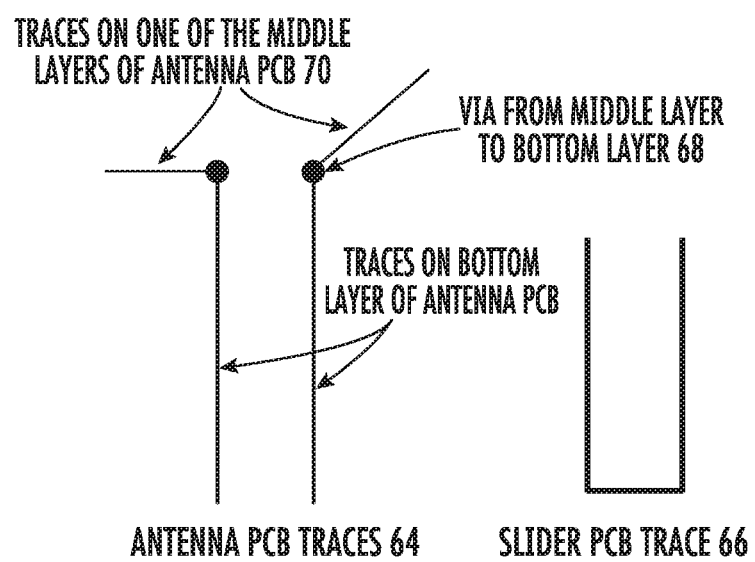
FIG. 8 illustrates traces configured to provide a trombone phase shifter.

FIG. 8 illustrates PCB traces for implementing a trombone structure to provide analog phase shift. The antenna PCB phase shifter fixed part 52 includes the antenna PCB traces 64 and the slider PCB phase shifter moving part 54 includes the slider PCB trace 66. The traces 64 and 66 are configured to overlap, the amount of overlap determining an amount of phase shift. Vias 68 may provide electrical connection between the antenna PCB traces 64 on one level and traces 70 on another level of the PCB. Other phase shifter configurations can also be used, such as a radial phase shifter structure.

Figure 9:
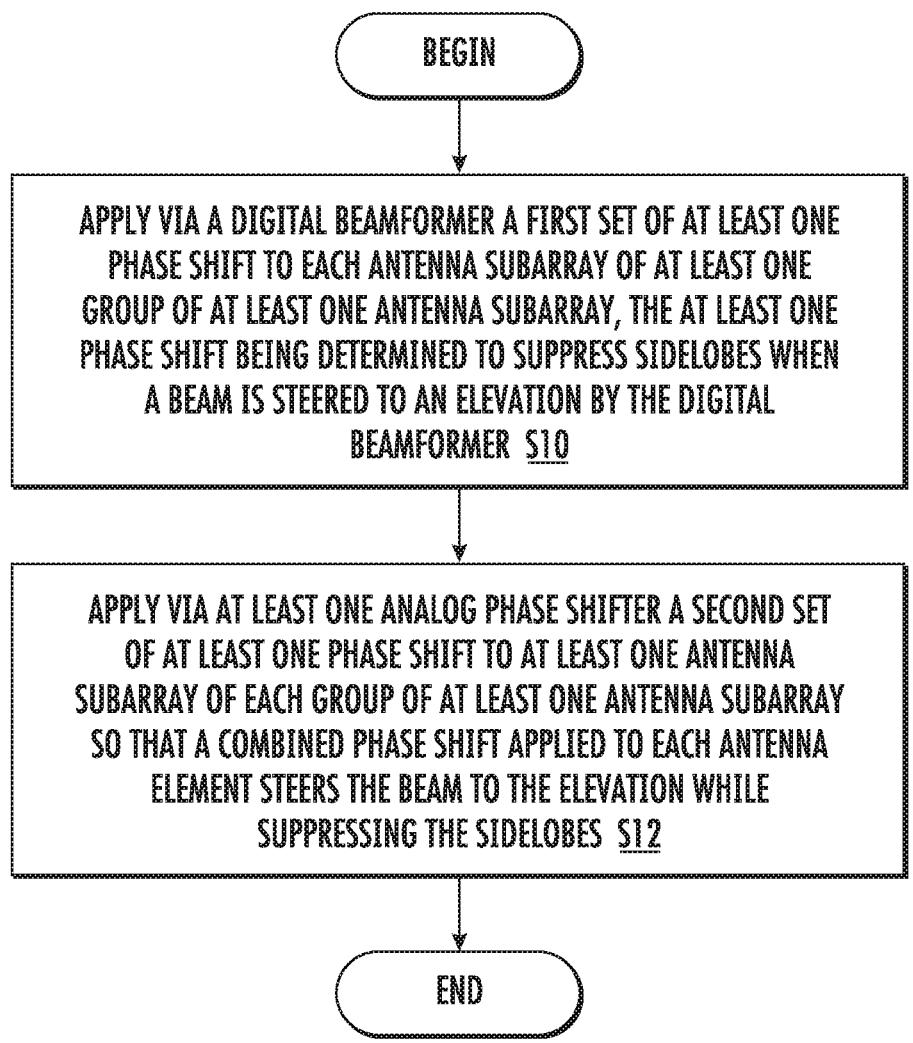
FIG. 9 is a flowchart of an example process for achieving HRET.

FIG. 9 is a flowchart of an example process for achieving HRET. The process includes applying via a digital beamformer 25 a first set of at least one phase shift to each antenna subarray of at least one group of at least one antenna subarray, the at least one phase shift being determined to suppress sidelobes when a beam is steered to an elevation by the digital beamformer (Block S10). The process also includes applying via at least one analog phase shifter 30 a second set of at least one phase shift to at least one antenna subarray of each group of at least one antenna subarray 28 so that a combined phase shift applied to each antenna element steers the beam to the elevation while suppressing the sidelobes (Block S12).

Thus, some embodiments provide hybrid remote electrical tilt (HRET) using digital beamforming and analog phase shifting in an optimal way to improve sidelobe suppression over known methods while enabling vertical tilt for massive MIMO and multicolumn advanced antenna systems (AAS). The HRET configurations disclosed herein can be used in 4G and 5G systems to improve electrical tilt and antenna system performance.

According to one aspect, a hybrid remote electrical tilt, HRET, antenna system 26, 44 having a distributed phase shifting system is provided. The HRET antenna system 26, 44, includes a digital beamformer 35 configured to apply a first set of at least one phase shift to each antenna subarray 28, 32 of at least one group of at least one antenna subarray 28, 32. The at least one phase shift is determined to suppress sidelobes when a beam is steered to an elevation by the digital beamformer 35. The HRET antenna system 26, 44 may also include at least one analog phase shifter 30 configured to apply a second set of at least one phase shift to at least one antenna subarray 28, 32 of each group of at least one antenna subarray 28, 32 so that a combined phase shift applied to each antenna element steers the beam to the elevation while suppressing the sidelobes.

According to this aspect, in some embodiments, each one of the at least one analog phase shifters is in proximity to a respective antenna subarray 28, 32. In some embodiments, the digital beamformer 35 is more remote from an antenna subarray 28, 32 than the analog phase shifter 30 and wherein the at least one analog phase shifter 30 is in proximity to the antenna subarray 28, 32. In some embodiments, each group of the at least one group has two antenna subarrays 28, 32, a phase shift of the first set of phase shifts being applied to both antenna subarrays 28, 32 in the group and a phase shift of the second set of phase shifts being applied to only one of the two antenna subarrays 28, 32 in the group of antenna subarrays 28, 32. In some embodiments, the HRET antenna system 26, 44 further includes a two way splitter, wherein the two antenna subarrays 28, 32 in a group of antenna subarrays 28, 32 are fed by the two way splitter. In some embodiments, the two way splitter is positioned in proximity to the analog phase shifter 30. In some embodiments, each antenna subarray 28, 32 is comprised of a pair of dual polarized antennas. In some embodiments, the at least one analog phase shifter 30 includes a sliding printed circuit board 50 configured to move with respect to an antenna printed circuit board 48 board having an antenna subarray 28, 32. In some embodiments, the sliding printed circuit board 50 has a U-shaped trace and is configured to overlap a trace on an antenna printed circuit board 48 having a plurality of antenna subarrays 28, 32. In some embodiments, the antenna printed circuit board 48 includes strip line traces, the strip line traces being connected to respective antennas using vias. In some embodiments, at least one of the at least one analog phase shifter 30 is configured to move radially. In some embodiments, the at least one analog phase shifter 30 is configured to be selectively disabled to achieve digital beam forming only.

According to another aspect, a method in an antenna system 26, 44 to achieve hybrid remote electrical tilt is provided. The method includes applying via a digital beamformer 35 a first set of at least one phase shift to each antenna subarray 28, 32 of at least one group of at least one antenna subarray 28, 32, the at least one phase shift being determined to suppress sidelobes when a beam is steered to an elevation by the digital beamformer 35. The method also includes applying via at least one analog phase shifter 30 a second set of at least one phase shift to at least one antenna subarray 28, 32 of each group of at least one antenna subarray 28, 32 so that a combined phase shift applied to each antenna element steers the beam to the elevation while suppressing the sidelobes.

According to this aspect, in some embodiments, the method includes positioning each one of the at least one analog phase shifter 30 in proximity to a respective antenna subarray 28, 32. In some embodiments, the digital beamformer 35 is more remote from an antenna subarray 28, 32 than the analog phase shifter 30 and the at least one analog phase shifter 30 is in proximity to the antenna subarray 28, 32. In some embodiments, each group of the at least one group has two antenna subarrays 28, 32, a phase shift of the first set of phase shifts being applied to both antenna subarrays 28, 32 in the group and a phase shift of the second set of phase shifts being applied to only one of the two antenna subarrays 28, 32 in the group of antenna subarrays 28, 32. In some embodiments, the two antenna subarrays 28, 32 in the group of antenna subarrays 28, 32 are fed by a two way splitter. In some embodiments, the two way splitter is positioned in proximity to the analog phase shifter 30. In some embodiments, each antenna subarray 28, 32 has four dual polarized antennas. In some embodiments, the analog phase shifter 30 includes a sliding printed circuit board 50 configured to move with respect to an antenna printed circuit board 48 having an antenna subarray 28, 32. In some embodiments, the sliding printed circuit board 50 has a U-shaped trace and is configured to overlap a trace on an antenna printed circuit board 48 having a plurality of antenna subarrays 28, 32. In some embodiments, the antenna printed circuit board 48 includes strip line traces, the strip line signal traces being connected to respective antennas using vias. In some embodiments, the method further includes radially moving the analog phase shifter 30 to adjust phase shift. In some embodiments, the method further includes selectively disabling the analog phase shifter 30 to achieve digital beam forming only.

Some abbreviations used herein include:

| Abbreviation | Explanation |
| --- | --- |
| AAS | Advanced Antenna Systems |
| FDD | Frequency Division Duplex |
| HRET | Hybrid remote electrical tilt |
| PIM | Passive Intermodulation |
| RET | Remote electrical tilt |
| TDD | Time Division Duplex |
| WCDMA | Wideband Code Division Multiple Access |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A hybrid remote electrical tilt (HRET) antenna system having a distributed phase shifting system, the HRET antenna system comprising:
   a chassis configured to hold a plurality of slider plates;
   a printed circuit board configured to be removably affixed to the chassis;
   a plurality of antenna subarrays on the printed circuit board, a subset of the plurality of antenna subarrays being in signal communication with a respective one of at least one analog phase shifter;
   a digital beamformer configured to apply a first set of phase shifts to the plurality of antenna subarrays, the first set of phase shifts being determined to suppress sidelobes when a beam is steered to an elevation by the digital beamformer;
   at least one analog phase shifter configured to apply a second set of at least one phase shift to at least one antenna subarray so that a combined phase shift applied to each antenna element steers the beam to the elevation while suppressing the sidelobes, the at least one analog phase shifter comprising a fixed part on the printed circuit board and a moving part assembled on the printed circuit board configured to move relative to the fixed part, the moving part being mechanically connected to the slider plates on the chassis, the moving part configured to adjustably overlap the fixed part;
   a motor configured to move the slider plates to cause the at least one phase shift; and
   at least one subarray splitter on the printed circuit board configured to split a signal from the digital beamformer to a first antenna subarray and to an analog phase shifter of the at least one analog phase shifter.

2. The HRET antenna system of claim 1, wherein each one of the at least one analog phase shifters is in proximity to a respective antenna subarray of the plurality of antenna subarrays.

3. The HRET antenna system of claim 1, wherein the digital beamformer is more remote from an antenna subarray than a respective one of the at least one analog phase shifter and wherein the at least one analog phase shifter is in proximity to the antenna subarray.

4. The HRET antenna system of claim 1, wherein each group of at least one antenna subarray of the plurality of antenna subarrays has two antenna subarrays, a phase shift of the first set of phase shifts being applied to both antenna subarrays in the group and a phase shift of the second set of phase shifts being applied to only one of the two antenna subarrays in the group of antenna subarrays.

5. The HRET antenna system of claim 1, wherein two antenna subarrays in a group of antenna subarrays of the plurality of antenna subarrays are fed by a splitter of the at least one subarray splitter.

6. The HRET antenna system of claim 5, wherein the splitter is positioned in proximity to an analog phase shifter of the at least one analog phase shifter.

7. The HRET antenna system of claim 1, wherein each antenna subarray of the plurality of antenna subarrays is comprised of a pair of dual polarized antennas.

8. The HRET antenna system of claim 1, wherein the at least one analog phase shifter includes a sliding printed circuit board configured to move with respect to the printed circuit board.

9. The HRET antenna system of claim 8, wherein the sliding printed circuit board has a U-shaped trace and is configured to overlap a trace on the printed circuit board.

10. The HRET antenna system of claim 8, wherein the printed circuit board includes strip line traces, the strip line traces being connected to respective antennas using vias.

11. The HRET antenna system of claim 1, wherein at least one of the at least one analog phase shifter is configured to move radially.

12. The HRET antenna system of claim 1, wherein the at least one analog phase shifter is configured to be selectively disabled to achieve digital beam forming only.

13. A method in an antenna system to achieve hybrid remote electrical tilt, the method comprising:
configuring a chassis to hold a plurality of slider plates;
configuring a printed circuit board to be removably affixed to the chassis;
configuring a plurality of antenna subarrays on the printed circuit board, a subset of the plurality of antenna subarrays being in signal communication with a respective one of at least one analog phase shifter;
applying via a digital beamformer to a first set of phase shifts to the plurality of antenna subarrays, the first set of phase shifts being determined to suppress sidelobes when a beam is steered to an elevation by the digital beamformer; and
applying via at least one analog phase shifter a second set of at least one phase shift to at least one antenna subarray so that a combined phase shift applied to each antenna element steers the beam to the elevation while suppressing the sidelobes, the at least one analog phase shifter comprising a fixed part on the printed circuit board and a moving part assembled on the printed circuit board configured to move relative to the fixed part, the moving part being mechanically connected to the slider plates on the chassis, the moving part configured to adjustably overlap the fixed part;
a motor configured to move the slider plates to cause the at least one phase shift; and
at least one subarray splitter on the printed circuit board configured to split a signal from the digital beamformer to a first antenna subarray and to an analog phase shifter of the at least one analog phase shifter.

14. The method of claim 13, wherein the at least one analog phase shifter is in proximity to a respective antenna subarray of the plurality of antenna subarrays.

15. The method of claim 13, wherein the at least one analog phase shifter is positioned so that the digital beamformer is more remote from an antenna subarray of the plurality of antenna subarrays than the analog phase shifter and wherein the at least one analog phase shifter is in proximity to the antenna subarray.

16. The method of claim 13, wherein each group of at least one antenna subarray of the plurality of antenna subarrays has two antenna subarrays, a phase shift of the first set of phase shifts being applied to both of the two antenna subarrays in the group and a phase shift of the second set of phase shifts being applied to only one of the two antenna subarrays in the group.

17. The method of claim 13, wherein two antenna subarrays in a group of antenna subarrays of the plurality of subarrays are fed by a two way subarray splitter of the at least one subarray splitter.

18. The method of claim 17, wherein the two way splitter is positioned in proximity to an analog phase shifter of the at least one analog phase shifter.

19. The method of claim 13, wherein each antenna subarray of the plurality of antenna subarrays has four dual polarized antennas.

20. The method of claim 13, wherein an analog phase shifter of the at least one analog phase shifter includes a sliding printed circuit board configured to move with respect to the printed circuit board.

21. The method of claim 20, wherein the sliding printed circuit board has a U-shaped trace and is configured to overlap a trace on the printed circuit board.

22. The method of claim 20 wherein the printed circuit board includes strip line traces, the strip line signal traces being connected to respective antennas using vias.

23. The method of claim 13, further comprising radially moving an analog phase shifter of the at least one analog phase shifters to adjust a phase shift.

24. The method of claim 13, wherein an analog phase shifter of the at least one analog phase shifter is configured to be selectively disabled to achieve digital beam forming only.

* * * * *